United States Patent [19]

Bologna

[11] 4,138,343
[45] Feb. 6, 1979

[54] APPARATUS FOR REMOVING DEBRIS DURING SEWAGE TREATMENT

[76] Inventor: Alfred Bologna, 5133 Leroy Dr., Gibsonia, Pa. 15044

[21] Appl. No.: 643,379

[22] Filed: Dec. 22, 1975

[51] Int. Cl.² .................................................. B01D 33/14
[52] U.S. Cl. ............................................................. 210/526
[58] Field of Search ................... 210/65, 83, 153, 160, 210/162, 159, 154, 198, 199, 200, 201, 202, 205, 207, 208, 523, 524, 525, 526, 528, 169, 156, 158

[56] References Cited

U.S. PATENT DOCUMENTS

| | | | |
|---|---|---|---|
| 677,567 | 7/1901 | Freeman | 210/160 |
| 944,907 | 12/1909 | Powers | 210/156 X |
| 986,231 | 3/1911 | Sloan | 210/162 |
| 1,910,803 | 5/1933 | Leonard | 210/162 |
| 2,078,127 | 4/1937 | Dalton | 210/158 |
| 2,090,384 | 8/1937 | Durdin | 210/205 |
| 2,204,703 | 6/1940 | Sanders | 210/205 X |
| 2,489,454 | 11/1949 | Henno | 210/160 X |
| 2,963,156 | 12/1960 | Nordell | 210/159 X |
| 3,121,680 | 2/1964 | Ciabattori | 210/205 X |
| 3,209,914 | 10/1965 | Nordell et al. | 210/159 |
| 3,599,795 | 8/1971 | Worlidge | 210/526 |
| 3,625,364 | 12/1971 | La Chance | 210/169 |
| 3,954,619 | 5/1976 | Fry | 210/242 |

FOREIGN PATENT DOCUMENTS 2259281  6/1973  Fed. Rep. of Germany ....... 210/242 S

*Primary Examiner*—Theodore A. Granger
*Attorney, Agent, or Firm*—George C. Atwell

[57] ABSTRACT

A rake-like structure is suspended near the surface of circulating liquid sewage in an open-top treatment tank to snare and retain rags and similar debris, enabling periodic removal and separate disposal of the debris, thereby preventing contaminated flow in valves and passages of the treating system and assuring a relatively clean liquid sludge as a product of the treatment process for use as fertilizer on open land. An endless conveyor arrangement is provided to automatically pick up collected debris from a modified form of the rake-like structure and transport it to a location outside the treatment tank.

2 Claims, 5 Drawing Figures

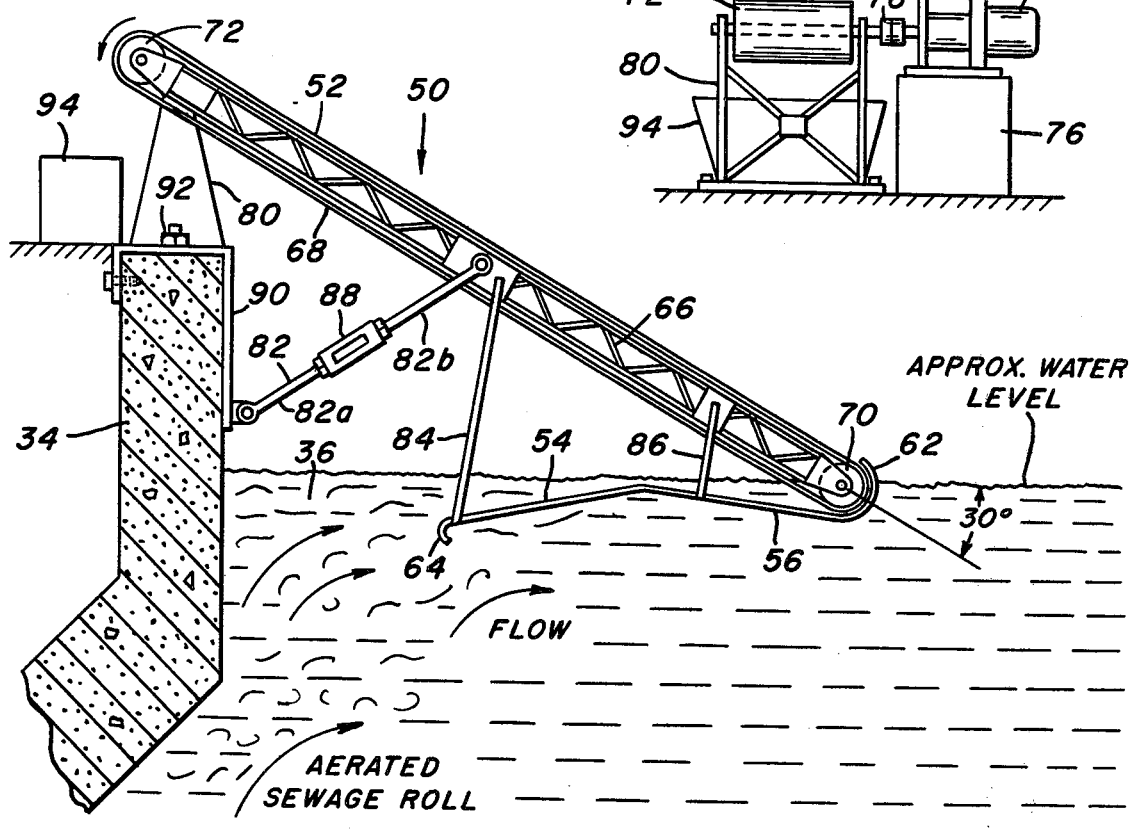
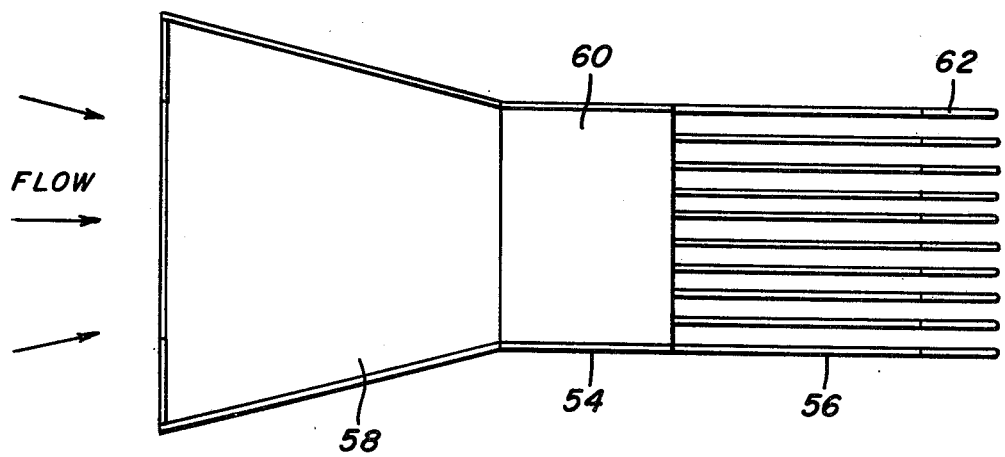

APPARATUS FOR REMOVING DEBRIS DURING SEWAGE TREATMENT

BACKGROUND OF THE INVENTION

This invention relates generally to water pollution control and the treatment of sewage as a part of a control program. More specifically, this invention pertains to control and removal of debris in sewage, such as rags, string, plastic sheeting scraps, etc., which are not biologically reducible in the treating process and tend to cause problems with respect to sewage flow and use of the sewage sludge product after treatment is completed.

There are various municipal approaches to treatment of sewage waste. One such approach involves aerobic digestion of sewage to produce a sludge which may be distributed in liquid form on arable land as fertilizer or may be dried in beds designed for such purpose to form a solid product of the treatment process.

A recurring problem in a typical aerobic digestion treatment facility is the presence of foreign matter which will not undergo reduction to solution during treatment and which will tend to clog lines, pumps, scum troughs or other apparatus of the facility. Such debris is also unslightly and undesirable if contained in the liquid sludge or dried solids which may be applied to lawns around homes, schools, churches or ballfields. In this latter instance, the presence of such debris clearly suggests the origin of the fertilizing material and is therefore generally socially unacceptable.

While comparatively large sewage treatment facilities can justify expensive automated equipment for removing debris from liquid sewage, municipalities having relatively small or intermediate systems or budget constraints which do not permit unusual capital expenditures nevertheless must contend with the debris problem.

The present invention comprehends, in one aspect, the provision of a unique but relatively simplified low cost means of sewage debris capture and removal which obviates the need for expensive equipment to perform this function. In another aspect, this invention comprehends a comparatively more sophisticated approach to debris removal from liquid sewage including means for automatically transporting collected debris from the treatment tank on a continuous basis.

SUMMARY OF THE INVENTION

The present invention provides, in a sewage treating system which includes an open-top tank wherein a step in the treatment process is conducted, a static device having no moving parts, which is adapted to be positioned across a pre-established sewage flow whereby rags, string and similar debris will impact against the device and be impaled thereon for manual removal.

In one presently preferred form, the apparatus of this invention comprises an elongated rigid frame having spaced-apart laterally extending teeth or tines on which rags or similar items will be impaled or snared. The rake-like element or device is preferably disposed in suspension near the surface of liquid sewage in the tank by means of an anchor line extending therefrom to a tethering point outside the tank and at an elevation convenient to an attendent or system operator. The treatment tank wherein the device is suspended is of the type adapted for oxygen injection to enhance aerobic action, and the oxygen directed into the liquid from sub-surface ports creates a continuous liquid turnover or generally unidirectional flow. The force of the flow at the surface of the liquid is utilized to maintain the suspended device in its operative position whereby it will intercept debris carried in the flow.

A more elaborate version of this invention includes and endless conveyor operatively combined with a modified form of the aforementioned rigid frame, with the conveyor adapted to transport collected debris continuously from the frame outwardly from the treatment tank and release it for manual pick-up and final disposal. In this form of the invention the frame tines are designed to intercept but not impede the continued progress of the liquid sewage flow. Here the tines are arranged to scoop rather than snare or hold the debris and promote the progress of the debris to the conveyor.

BRIEF DESCRIPTION OF THE DRAWING

Structural details, features and advantages of the present invention will be apparent from the ensuing detailed description and by reference to the accompanying drawing wherein;

FIG. 3 illustrates a second comparatively more elaborate form or embodiment of the invention and is a side elevational view of the structure of this embodiment in its installed operative position in a partially illustrated treatment tank;

FIG. 4 is a top plan view of a component of the structure first shown in FIG. 3, here shown in enlarged scale as compared to FIG. 3; and FIG. 5 is a view primarily illustrating drive means for the structure shown in FIG. 3.

DETAILED DESCRIPTION OF THE PREFERRED EMBODIMENTS

Figure 1:
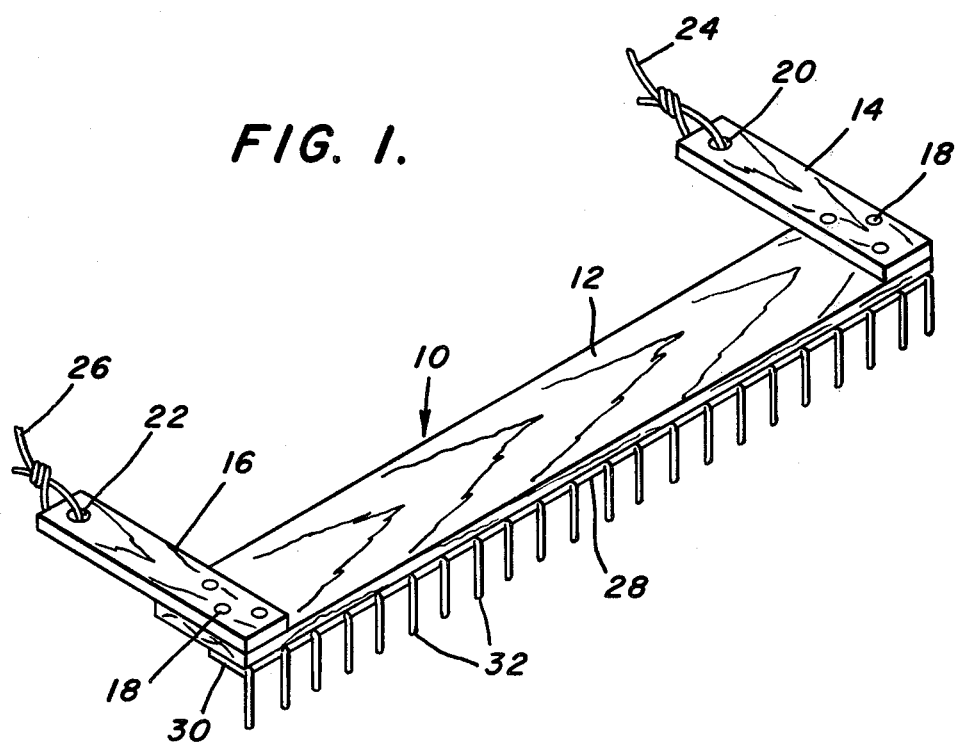
FIG. 1 is a perspective view of one presently preferred form of the device of the present invention.

In FIG. 1 there is shown apparatus in the form of a rake-like element or debris collecting device 10. The device 10 is formed from a major body member 12 which may be an elongated wooden board properly treated to resist deterioration from liquid submersion. Fastened at opposite ends of the member 12, in parallel relation to each other and projecting laterally at a right angle to the long edge of the member 12, are legs 14 and 16. One end of each of the legs 14 and 16 is firmly attached in abutment to the upper surface of the member 12 by means of screws or bolts 18, and the opposite ends of each of the legs 14 and 16 are provided with openings 20 and 22 which accommodate, respectively, ends of anchor lines 24 and 26 respectively attached therethrough. To the undersurface of the member 12, along the long edge thereof which is opposite the direction of projection of the legs 14 and 16, is attached a heavy wire framework 28 having a base portion 30 contiguous to the undersurface of the member 12, and having downwardly projecting parallel spaced-apart fingers or tines 32.

Figure 2:
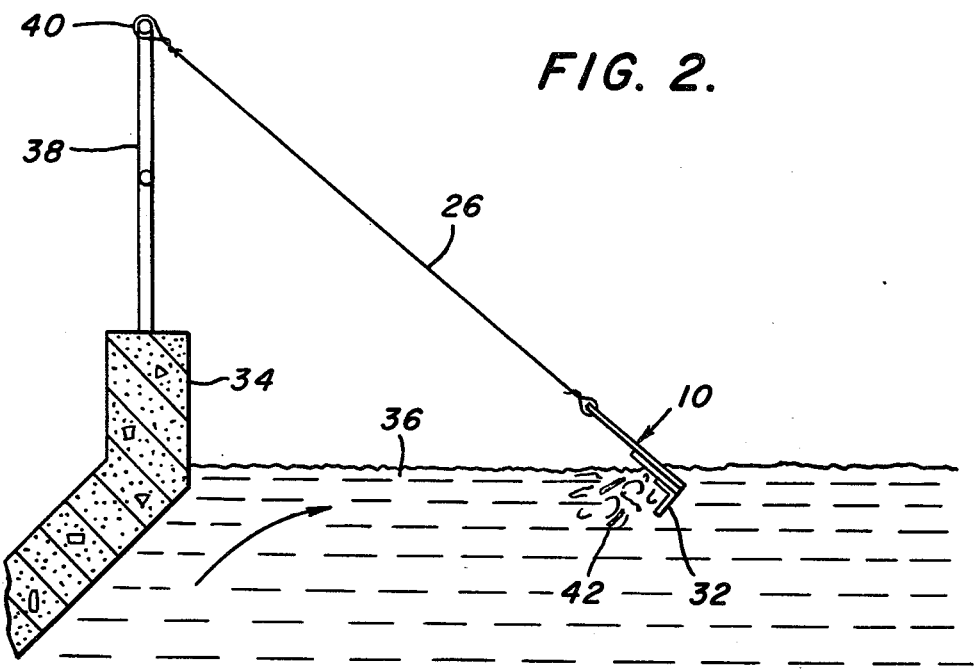
FIG. 2 is a partial view in vertical section of a treatment tank illustrating the form of the present invention shown in FIG. 1 in its operative position.

FIG. 2 illustrates a portion of a treatment tank, showing only the tank's wall portion 34. Contained in the treatment tank is liquid sewage 36 which is subjected (by means not shown) to gaseous injection to increase oxygenation whereby a continuous flow or liquid circulation is established within the tank. The direction of flow is arcuate and generally unidirectional, following a pathway near the surface of the liquid sewage as indicated by the arrow in FIG. 2.

The device or structure 10 is adapted for suspension in the flow path, generally as shown in FIG. 2, whereby the major portion of the device 10 is subjacent the surface of the liquid sewage 36. The anchoring lines 24 and 26 are tethered to a point above the wall 34 whereby the lines extend away from the direction of flow. In this instance, a guardrail assembly 38 having a top rail 40 provides a convenient location for anchoring the ends of lines 24 and 26.

In operation the device 10 tends to float near the surface of the liquid sewage 36 as shown in FIG. 2 whereby the moving flow at the surface level will intersect the downwardly projecting tines 32. While the liquid will move through the interstices between the tines 32, rags, strings, rubber refuse, and plastic scraps carried by the flow are intercepted by the tines and held on the undersurface of the device due to the force of the flow or are, in fact, entertwined about or impaled on the tine points. When the device 10 has collected a substantial amount of such refuse, an attendant may then retrieve the device 10 by grasping the lines 24 and 26 and pulling the device 10 across the surface of the liquid sewage to the wall 34 where the refuse can be removed from the device 10. After the device 10 is cleared of the refuse, it need merely be dropped back into the tank whereby the flow will carry it outwardly to the operative position shown in FIG. 2.

Referring again to FIG. 1, it should be noted that the specific design of the device 10 can be altered or modified in accordance with tank size or the location of the points for anchoring the outer ends of lines 24 and 26, in order to maintain the effective performance of the device. For example, tines 32 can be made longer and/or can be angled in an obtuse relationship to the undersurface of the member 12 to increase the size of the pocket area wherein debris is captured beneath the device 10. In the embodiment illustrated, the tines 32 are extensions of heavy wire fabric such as concrete reinforcing fabric but, alternatively, they may be constructed from heavy gauge aluminum or stainless steel. It is presently preferred that the anchoring lines 24 and 26 be substantially heavy-weight nylon cord to withstand long-term abuse. The use of treated wood in the body of the device 10 provides buoyancy whereby the flow force of the liquid sewage is adequate to hold the naturally floating device in its operative position.

Referring now to FIGS. 3 and 4, it will be seen that a modified and somewhat more sophisticated version of the structure in accordance with the present invention comprises an assembly 50 which includes a belt-type conveyor 52 and a flow intercepting apparatus 54. In this version of the invention, the scoop 54 serves as a flow-intercepting apparatus or means adapted to gather debris from the rollover flow of liquid sewage 36 and direct it to the receiving end of the conveyor 52. The apparatus 54, as shown in FIG. 4, is also a rake-like element having spaced apart tines 56, however the tines 56 are arranged for a purpose different from the tines 32 of the rake-like element shown in FIG. 1, as will hereafter be described in greater detail.

The apparatus 54 is operatively similar to the rake-like element shown in FIG. 1 inasmuch as it serves as flow-intercepting apparatus for removing debris such as rags or string from the flow and is suspended in its operative position, below the surface of the liquid sewage, and is adapted to retain collected debris while permitting the flow to continue to circulate unimpeded. The particular configuration of the apparatus 54 is designed to direct intercepted debris from a downwardly disposed collecting end projecting across the direction of liquid sewage flow and toward a pick-up point from where the debris is transported by the conveyor 52 outwardly from the treatment tank. The downwardly disposed end of the apparatus 54 is formed as a pan or scoop 58 having a wide outer end which tapers inwardly to an integral relatively smaller pan portion 60. Extending from the pan portion 60 are spaced apart parallel rods or tines 56. The rods 56 are uniformly arcuately curved upwardly whereby arcuate ends 62 thereof project above the surface of the liquid sewage 36. The lowest point of the apparatus 54 is the outer end or skirt 64 of the scoop 58 which is smoothly rolled downwardly and rearwardly whereby its edge projects generally in the direction of movement of the roll-over circulating flow of liquid sewage in the treatment tank.

The conveyor 52 is comprised of a support structure 66 supporting an endless belt 68 on rotatable idler and driven rollers 70 and 72 journalled at opposite ends of the support structure 66. The conveyor 52 is adapted to be operated in a continuous matter by means of a motor 74 shown mounted on a support base 76 in FIG. 5. The motor 74 drives the conveyor roller 72 by means of a coupling 78, and the rotation of the roller 72 is translated to the endless belt 68 carried about the driven roller 72 and the idler roller 70.

As shown in FIG. 3, the entire assembly 50 is supported on the treatment tank sidewall 34 in a suspended cantilever arrangement. The end of the conveyor 52 has a rigid supporting framework 80 which projects from the top surface of the wall 34. Further suspension support is provided for the assembly in the form of a rod 82 extending from an inside point on the wall 34 and outwardly-upwardly to a connection at its opposite end to a central point on the conveyor support structure 66. As shown in FIG. 5, the support framework 80 is preferably connected to the conveyor 52 by pillow blocks jounalling the central shaft through the roller 72 whereby the entire conveyor can be pivoted about the axis of the roller 72. This arrangement enables the provision of means on the rod 82 for adjusting its length to thereby control the depth of emersion of the apparatus 54 which is suspended from the conveyor support structure 66 by spaced-apart legs 84 and 86. It should be noted that the rod 82 is comprised of two parts 82a and 82b, each of which is externally threaded to form an adjustable turn buckle arrangement in combination with a centrally bored internally threaded collar 88. An annular surface portion of the collar 88 is provided from external flats to mate with wrench jaws enabling manual rotation of the collar 88 in adjusting the length of the rod 82 to thereby most advantageously position the suspended end of the entire assembly 50. A cap plate 90 may be formed from steel plate to conformably overlay the upper end of the sidewall 34 and such cap plate 90 may have a pivot connection welded to the cap plate 90 to project therefrom whereby fastening the cap plate 90 in position by means of bolts 92 embedded in the wall 34 will serve to locate and support the entire assembly 50.

The operation of the entire assembly 50 illustrated in FIG. 3 is conducted on a substantially continuous basis in unison with the aeration treatment occurring in the tank whereby the liquid sewage is circulating in a roll-over flow in the direction shown by the arrows in FIG. 3 such that undesirable debris following the current pathway will move close to the surface of the flow and onto the pan or scoop 58, progressing with the liquid sludge flow across the pan 58 to the pan portion 60 and thence into the area of the rods 56 where the liquid sludge flow will move between the rods and continue with the roll-over progression through the treatment tank. The force of the flow across the pan 58, with the apparatus 54 located relative to the surface of the liquid sludge substantially as shown in FIG. 3, is sufficient to push debris across the pan 58 and then toward and longitudinally along the rods 56. The receiving end of the conveyor is located relative to the rods 56 such that the belt 52 is spaced approximately ⅛ inch distance from the inside surface of the arcurately-upwardly curved ends 62 of the rods 56, thereby defining an arcuate entrapment slot where collected rags, string or plastic film are squeezed between the tines 62 and the belt surface. Friction between the surface of the belt and the compressed debris will cause the debris to be pulled in an upward sweep along the inside of the curved tines 62 and onto the upwardly facing surface of the moving belt for transport outwardly from the treatment tank. The debris is then carried by the belt to the area of the conveyor's upper end where it drops by force of gravity from the belt into a collection means such as receptacle 94 shown in FIG. 5.

By benefit of this disclosure it is believed obvious to modify the structure shown in FIGS. 3, 4 and 5 in accordance with the size of almost any treatment tank and to position the structure for operative compatibility to the speed and other characteristics of the liquid sludge flow in the tank. In the presently preferred embodiment, the length of the conveyor arrangement, taken between the axes of the rollers 70 and 72, is six feet, and the conveyor belt 52 has a length of 156 inches. The conveyor is operated at a relatively slow speed whereby the rollers 70 and 72 turn at approximately four revolutions per minute and the belt completes one full cycle of movement in slightly more than two minutes. It is preferred that the entire conveyor assembly 50 be disposed in its cantilevered arrangement whereby the suspended apparatus 54 lies just beneath the surface of the liquid sludge, with a portion of the belt 52 moving on the undersurface of the roller 70 in a submerged orientation. The desired disposition of the structure 50 can be established and maintained either by adjustment of the rod 82 and/or control of the depth of liquid sludge in the treatment tank.

With reference to the scoop 54, it should be noted that the skirt 64, by its downward configuration, serves as a smooth point of transition whereby debris impacting thereagainst will either be swept onto the scoop 54 or will pass beneath it to be picked up later but will not tend to hang up at the outer edge of the scoop 54 as would be the case if the edge thereof was sharp or abrupt.

The structures described herein and shown in the accompanying drawings are for the purpose of illustration only, and are not intended to limit the scope of the invention. It is contemplated that the invention and the method of its use may be variously adapted in any sewage treatment system wherein a liquid sewage current flow is established to permit suspension therein of the disclosed apparatus so debris carried in the flow can be intercepted and collected. Accordingly, changes or modifications may be made in the invention without departing from the spirit and scope thereof as defined in the appended claims.

I claim:

1. A sewage treating system including a holding tank at least partially defined by a wall portion and having an open top, liquid sewage in the tank movable in a continuous roll-over current flow to promote aeration and generally maintaining a predetermined surface level in the tank, debris collecting apparatus in combination with the tank including conveyor means a rigid scoop assembly generally subjacent the lower end of the conveyor means whereby it is disposed in the liquid sewage near the surface thereof, the scoop assembly having a pan portion and a tine portion projecting beneath the conveyor means, the pan portion being oriented to continuously receive sewage flow thereover and direct it to the tine portion, the tine portion having spaced-apart elongated tines extending uniformly from the pan portion in the direction of current flow whereby debris in the sewage flow moving over the pan portion will collect on the tines and be urged to progress over and along the tines by force of the flow, the tines extending substantially straight from the pan portion and terminating in arcuate ends which curve upwardly, and the conveyor means being arranged to collect debris from the arcuate ends of the tines and deliver it outside the tank.

2. The system of claim 1 wherein the conveyor means is an endless belt conveyor having an outer end located above the wall portion and the lower end projecting into the tank whereby the belt thereof moves about rollers at each of the ends and at the lower end in close proximity to the tine portion of the scoop assembly, and the curved ends of the tines being shaped to conformably wrap outwardly about the inner end of the conveyor such that the belt moves in a path closely adjacent the tines' curved ends to cause collected debris to transfer to the moving belt.

* * * * *